United States Patent [19]

Williams

[11] Patent Number: 4,821,891

[45] Date of Patent: Apr. 18, 1989

[54] SHAPE SAVING HAT RACK

[75] Inventor: Kenneth A. Williams, Spring, Tex.

[73] Assignee: Utopia International, Missouri City, Tex.

[21] Appl. No.: 154,363

[22] Filed: Feb. 10, 1988

[51] Int. Cl.⁴ ............................................. A47F 7/06
[52] U.S. Cl. ..................................... 211/31; 211/181
[58] Field of Search ................ 211/31, 30, 32, 95, 211/96, 168, 181

[56]  References Cited

U.S. PATENT DOCUMENTS

| 1,454,962 | 5/1923 | Dye | 211/31 |
| 1,855,908 | 4/1932 | Firsty | 211/31 |
| 2,196,945 | 4/1940 | Shullaw | 211/31 |
| 3,405,808 | 10/1968 | Thompson | 211/31 |

Primary Examiner—J. Franklin Foss
Assistant Examiner—Sarah A. Lechok Eley
Attorney, Agent, or Firm—Larry Mason Lee

[57]  ABSTRACT

The instant invention comprises an improvement in hat racks useful for storing and carrying a soft-brimmed western-style hat adjacent to the ceiling of an automobile or truck passenger enclosure. The improvement resides in the shape of the frame of the hat rack. Said hat rack frame is shaped in such fashion that no pressure is asserted on the brim of a hat which is inserted in said hat rack, other than that pressure caused or asserted by the weight of the crown of the hat, as the hat is inserted in and rests within said hat rack in an upside-down configuration whereby the crown of the hat extends down from the hat rack into the automobile or truck passenger enclosure.

3 Claims, 2 Drawing Sheets

SHAPE SAVING HAT RACK

SUMMARY OF THE INVENTION

This invention relates to an improvement in hat racks useful in storing and carrying western-style hats adjacent to the ceiling of the passenger enclosure of an automobile or truck. More particularly, this invention relates to an improvement in hat racks useful in storing and carrying soft brimmed western-style hats in a crown down attitude adjacent to the ceiling of the passenger enclosure of an automobile and/or truck without forcing the hat brim into contact with said ceiling.

It is frequently desirable for drivers and/or passengers of automobiles and trucks to remove their hats while within the confines of the passenger enclosures of the automobiles or trucks. Current fashion in hats is such that hats are often soft brimmed, fragile items wherein the brim shape is not planar within two dimensions, which are prized for, among other attributes, their shape and are relatively expensive, albeit necessary, accoutrements for a man, being badges reflective of breeding, political persuasion and social standing. Accordingly, it is a matter of no small concern to the owners and wearers of hats that the hat shall be stored and/or carried safely and securely, without deformation of either the crown or the brim of the hat, when the owner or wearer of the hat is a driver and/or passenger within the passenger enclosure of an automobile and/or truck.

Previously, hat racks have been developed which are useful for storing and/or carrying a hat adjacent to the ceiling of the passenger enclosure of an automobile. The inventors and manufacturers of said hat racks recognized and attempted to deal with and overcome the problem of hat brim deformation during use of said hat racks. The design of one currently popular hat rack addresses and purports to overcome the problem of hat brim deformation by utilizing a spring wire frame which is bowed in a direction transverse to the general plane of the wire frame such that the frame of the hat rack is vertically displaced at the apogee of its curvature away from the ceiling of the automobile or truck passenger enclosure in which said hat rack is installed. However, during use said currently popular hat rack does, by gradual deformation or otherwise, lose its wire frame curvature and thus its displacement from the ceiling, with the result that the brim of the hat stored and/or carried within said hat rack is pressed against the ceiling and the brim of the hat is thereby subjected to deformation forces.

Accordingly, it is an object of this invention to provide an improved hat rack for use in the passenger enclosure of an automobile and/or truck.

It is another object ot this invention to provide an improved hat rack which may be installed for use by attachment to the ceiling of the passenger enclosure of an automobile and/or truck.

It is another object of this invention to provide an improved hat rack which may be installed for use by attachment to the ceiling of the passenger enclosure of an automobile and/or truck and which hat rack has a frame constructed such that a hat inserted within said hat rack frame for storage and/or carrying is displaced from said ceiling whereby the brim of said hat is not deformed due to being pressed against said ceiling.

It is another object of this invention to provide an improved hat rack which may be installed for use by attachment to any flat surface and which hat rack has a frame constructed such that a hat inserted within said hat rack frame for storage and/or carrying is displaced from said flat surface whereby the brim of said hat is not deformed due to being pressed against said flat surface.

It is yet another object of this invention to provide an improved hat rack which may be installed for use by attachment to the ceiling of the passenger enclosure of an automobile and/or truck and into which hat rack a hat may be easily and conveniently inserted and removed.

These objects and others are attained by the instant invention as directed in the drawings and detailed description of the invention that follows.

DESCRIPTION OF THE PREFERRED EMBODIMENT

Figure 1:
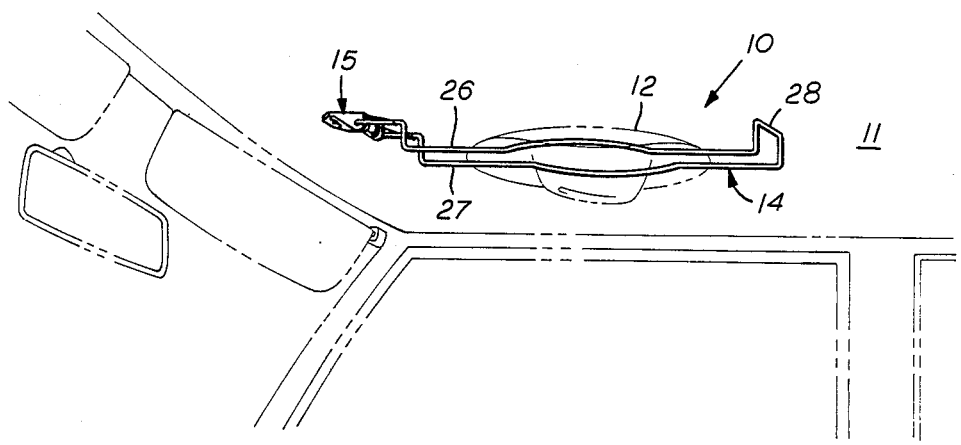
FIG. 1 is a perspective view of a portion of the interior of the passenger enclosure of an automobile or truck with the improved hat rack of the present invention in position for use, supporting a western-style hat.

The Shape Saving Hat Rack 10, comprising in major division a wire frame 14 and a mounting bracket 15, is shown in FIG. 1 installed on the ceiling 11 of the passenger enclosure of an automobile and/or truck. The mounting bracket 15 of the Shape Saving Hat Rack 10 is seen to be attached to the ceiling. A hat 12 is shown to be inserted within the wire frame 14 for storage and/or carrying.

Figure 4:
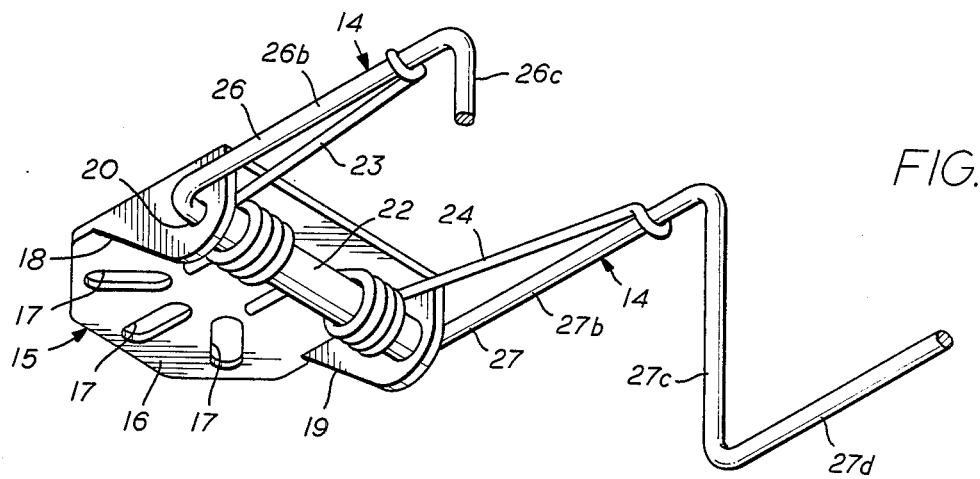
FIG. 4 is a perspective view of the assembled mounting bracket and hinge of the improved hat rack of the present invention.
Figure 5:
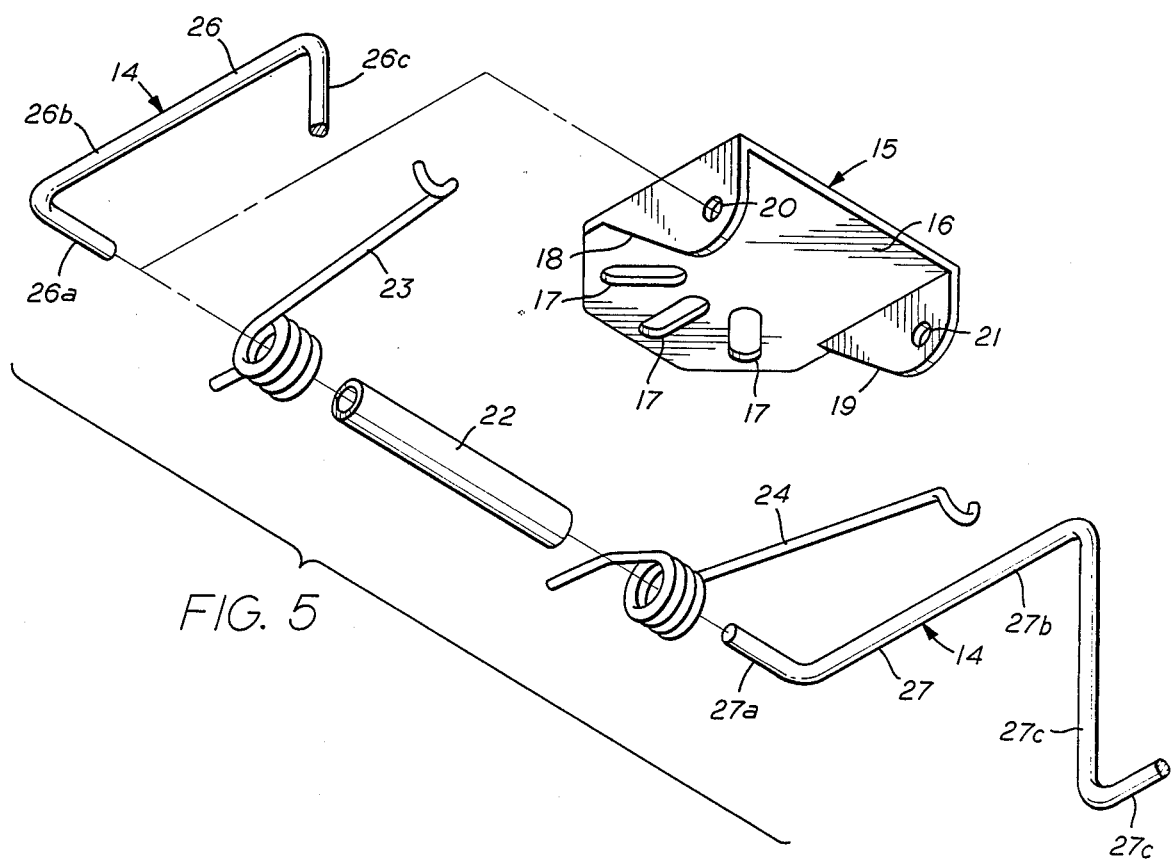
FIG. 5 is a horizontal plane view of the disassembled components of the mounting bracket and hinge of the improved hat rack of the present invention

As seen in FIG. 4, the mounting bracket 15 includes a plate 16 having slots 17 through with mounting screws may be inserted and apertured lugs 18 and 19. A tube 22 is seated between the apertures 20 and 21. The in-turned ends 26a and 27a of the wire frame 14 are rotatably inserted in the opposite ends of tube 22. Coiled about the tube 22 are the springs 23 an 24. Each of the springs 23 and 24 has one end lodged against the face of the plate 16 and has its other, longer end forming a loop coiled around the segments 26b and 27b of the wire frame 14. The springs 23 and 24 are each stressed torsionally so as to normally urge the wire frame 14 toward the ceiling 11 of the automobile and/or truck passenger enclosure.

Figure 2:
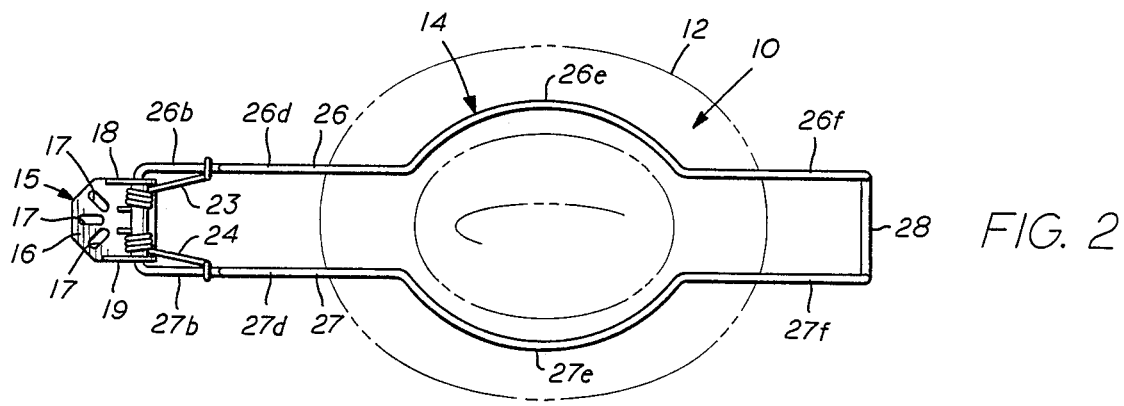
FIG. 2 is a horizontal plane view of the improved hat rack of the present invention.
Figure 3:
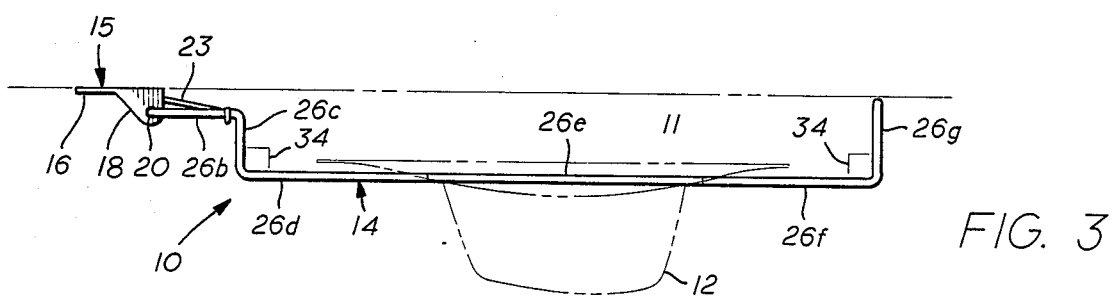
FIG. 3 is a vertical plane view of the improved hat rack of the present invention.

FIG. 2 and FIG. 3 show the wire frame 14 to be formed of a single, stiff continuous length of wire. The shape of the wire frame 14, as viewed in a horizontal plane as in FIG. 2, is substantially that of a rectangle wherein one of the short sides of the rectangle is discontinuous at the ends 26a and 27a of the above-mentioned length of wire and wherein the two long sides 26 and 27 of the rectangle each contain, at a point intermediate to the ends of each of said long sides 26 and 27, oppositely and outwardly bowed segments 26e and 27e which form a substantially circular opening to loosely receive the crown of a hat. The shape of the wire frame 14, as viewed ina vertical plane as in FIG. 3, is essentially planar in two dimensions with two pairs of end segments 26c, 27c and 26g, 27g upturned at steep angles 34, approaching ninety degrees.

After installation and attachment to an automobile and/or truck ceiling 11, the wire frame 14 will be maintained by the springs 3 and 24 in its normal or at rest position, with its end segment 28 bearing against the ceiling 11. Operation of the Shape Saving Hat Rack 10 is accomplished by pulling the wire frame 14 downward, away from the ceiling 11, and placing the crown of a hat 12 through the essentially circular opening formed by the bowed segments 26e and 27e, and then releasing the wire frame 14 so that the wire frame 14 can swing back toward the ceiling 11 and return to its at rest position.

Assuming that the pairs of end segments 26c, 27c and 26g, 27g are sufficiently long, that portion of the wire frame 14 which in the at rest position of the Shape Saving Hat Rack 10, is parallel to the ceiling 11 will be sufficiently displaced from the ceiling 11 to avoid pressing the soft, fragile, shaped brim of a hat 12 inserted therethrough against the ceiling. Thus will deforming forces be avoided and the integrity of the shape of the brim of the hat 12 maintained.

This invention has been described in terms of single preferred embodiment, however numerous embodiments are possible without departing from the essential characteristics thereof. Accordingly, the description has been illustrative and not restrictive as the scope of the invention is defined by the appended claims, not by the description preceding them, and all changes and modifications that fall within the stated claims or form their functional equivalents are intended to be embraced by the claims.

I claim:

1. In a holder for securing a hat adjacent a substantially flat surface, wherein said holder comprises a mounting bracket adapted for attachment to said flat surface; a frame comprising a single length of substantially rigid material, with opposed facing ends, said frame including a hat-crown receiving portion of substantially rectangular configuration with outwardly bowed segments opposite one another and intermediately located along the long sides of said rectangularly configured portion; and a hinge connected to said mounting bracket, said hinge rotatably receiving said frame's ends, said hinge including a torsionally stressed spring connected at one end to said mounting bracket and at the other end to said frame whereby said frame is biased toward said flat surface; the improvement comprising:
   said crown receiving portion's long sides defining a plane; and
   means for displacing said plane substantially equidistant from said flat surface throughout the area defining said crown receiving portion for the purpose of providing support to said hat along the greater extent of each of said frame portions long sides.

2. The holder of claim 1 wherein said displacing means includes frame segments, opposite said hinge, depending from said crown receiving portion and angularly related thereto.

3. The holder of claim 1 wherein said displacing means includes opposed pairs of frame segments, depending from each end of said crown receiving portion, each pair defining a further plane angularly related to said crown portions plane.

* * * * *